(12) United States Patent
Lee et al.

(10) Patent No.: US 11,681,123 B2
(45) Date of Patent: *Jun. 20, 2023

(54) OPTICAL IMAGING SYSTEM

(71) Applicant: SAMSUNG ELECTRO-MECHANICS CO., LTD., Suwon-si (KR)

(72) Inventors: Tae Youn Lee, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 199 days.

This patent is subject to a terminal disclaimer.

(21) Appl. No.: 17/159,397

(22) Filed: Jan. 27, 2021

(65) Prior Publication Data
US 2021/0149154 A1    May 20, 2021

Related U.S. Application Data

(63) Continuation of application No. 16/244,287, filed on Jan. 10, 2019, now Pat. No. 10,935,758, which is a continuation of application No. 15/467,433, filed on Mar. 23, 2017, now Pat. No. 10,215,957.

(30) Foreign Application Priority Data

Sep. 12, 2016 (KR) .................. 10-2016-0117293

(51) Int. Cl.
*G02B 9/64* (2006.01)
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
None
See application file for complete search history.

(56) References Cited

U.S. PATENT DOCUMENTS 8,599,495 B1   12/2013   Tsai et al.
8,885,268 B2   11/2014   Tang et al.
9,239,447 B1   1/2016    Chen
(Continued)

FOREIGN PATENT DOCUMENTS

CN    103913821 A    7/2014
CN    204832662 U    12/2015
(Continued)

OTHER PUBLICATIONS

Korean Office Action dated Sep. 9, 2021 in counterpart Korean Patent Appiication No. 10-2018-0036432 (6 pages in English and 4 pages in Korean).
(Continued)

*Primary Examiner* — Darryl J Collins
(74) *Attorney, Agent, or Firm* — NSIP Law

(57) ABSTRACT

An optical imaging system includes a first lens having a positive refractive power, a second lens having a negative refractive power, a third lens having a negative refractive power, a fourth lens, a fifth lens, and a sixth lens having a positive refractive power and having a convex image-side shape, sequentially arranged in a direction from an object side of the optical imaging system to an imaging plane of the optical imaging system.

18 Claims, 14 Drawing Sheets

(56) References Cited

U.S. PATENT DOCUMENTS

| | | | |
|---|---|---|---|
| 9,857,563 B2 | 1/2018 | Liao et al. | |
| 10,215,957 B2 | 2/2019 | Lee et al. | |
| 10,935,758 B2* | 3/2021 | Lee | G02B 13/0045 |
| 2014/0029116 A1 | 1/2014 | Tsai et al. | |
| 2014/0111876 A1 | 4/2014 | Tang et al. | |
| 2014/0192422 A1 | 7/2014 | Tang et al. | |
| 2015/0138431 A1 | 5/2015 | Shin et al. | |
| 2015/0338611 A1 | 11/2015 | Jung et al. | |
| 2016/0124191 A1 | 5/2016 | Hashimoto | |
| 2016/0187620 A1 | 6/2016 | Huang | |
| 2016/0187621 A1* | 6/2016 | Chen | G02B 13/0045 359/713 |
| 2017/0108665 A1 | 4/2017 | Huang | |
| 2017/0146776 A1 | 5/2017 | Kang et al. | |
| 2017/0248770 A1 | 8/2017 | Chen et al. | |
| 2017/0307850 A1 | 10/2017 | Jhang et al. | |
| 2017/0315334 A1 | 11/2017 | Liao et al. | |
| 2018/0059372 A1 | 3/2018 | Cheng et al. | |
| 2018/0074296 A1 | 3/2018 | Lee et al. | |

FOREIGN PATENT DOCUMENTS

| | | |
|---|---|---|
| CN | 105807408 A | 7/2016 |
| CN | 106526790 A | 3/2017 |
| CN | 106597634 A | 4/2017 |
| CN | 106940468 A | 7/2017 |
| CN | 107329234 A | 11/2017 |
| CN | 206946087 U | 1/2018 |
| JP | 2015-43104 A | 3/2015 |
| KR | 10-2015-0059212 A | 6/2015 |
| KR | 10-2015-0135860 A | 12/2015 |

OTHER PUBLICATIONS

Chinese Office Action dated Jan. 27, 2022 in corresponding Chinese Patent Application No. 202110301714.6.

Chinese Office Action dated Sep. 4, 2019 in counterpart Chinese Patent Application No. 201710377617.9 (13 pages in English, 11 pages in Chinese).

Chinese Office Action dated Mar. 19, 2020 in counterpart Chinese Patent Application No. 201710377617.9 (14 pages in English, 9 pages in Chinese).

Korean Office Action dated Jul. 24, 2017 in counterpart Korean Patent Application No. 10-2016-0117293 (6 pages in English, 4 pages in Korean).

Korean Office Action dated Jan. 31, 2018 in counterpart Korean Patent Application No. 10-2016-0117293 (6 pages in English, 4 Pages in Korean).

* cited by examiner

| FIRST EXAMPLE | | | | | |
|---|---|---|---|---|---|
| HFOV = 23.80 | f = 5.991 | | TTL = 5.390 | | |
| SURFACE NUMBER | | RADIUS OF CURVATURE | THICKNESS/ DISTANCE | REFRACTIVE INDEX | ABBE NUMBER | FOCAL LENGTH |
| S0 | OBJECT | infinity | infinity | | | |
| S1 | FIRST LENS | 1.5100 | 0.9090 | 1.544 | 56.090 | 2.760 |
| S2 | | -642.0400 | 0.1200 | | | |
| S3 | SECOND LENS | 6.3800 | 0.2400 | 1.661 | 20.340 | -6.950 |
| S4 | | 2.6500 | 0.1810 | | | |
| S5 | DIAPHRAM | Infinity | 0.1610 | | | |
| S6 | THIRD LENS | -5.2300 | 0.2400 | 1.650 | 21.460 | -5.750 |
| S7 | | 13.6400 | 0.0860 | | | |
| S8 | FOURTH LENS | 8.1900 | 0.2620 | 1.650 | 21.460 | 12.410 |
| S9 | | -2000.0000 | 1.1880 | | | |
| S10 | FIFTH LENS | 3.0800 | 0.2900 | 1.544 | 56.090 | -4.230 |
| S11 | | 9.5900 | 0.1210 | | | |
| S12 | SIXTH LENS | 17.5000 | 0.7120 | 1.650 | 21.460 | 12.190 |
| S13 | | -14.5500 | 0.0200 | | | |
| S14 | FILTER | Infinity | 0.1100 | 1.523 | 39.070 | |
| S15 | | Infinity | 0.7500 | | | |
| S16 | IMAGING PLANE | Infinity | | | | |

FIG. 3

| | K | A | B | C | D | E | F | G | H | J |
|---|---|---|---|---|---|---|---|---|---|---|
| 1 | -0.34223 | 9.73825E-03 | 7.19779E-03 | -2.34186E-02 | 6.49039E-02 | -1.00892E-02 | 8.70689E-02 | -3.99777E-02 | 7.23424E-03 | |
| 2 | 0.00000 | 6.92455E-02 | -9.57293E-02 | 3.49809E-02 | 9.56573E-02 | 2.30974E-01 | 2.28414E-01 | 1.02863E-01 | 2.12098E-02 | |
| 3 | 0.00000 | 9.02875E-02 | -2.52450E-01 | 9.57806E-01 | -3.29260E+00 | 7.80410E+00 | -1.18763E+01 | 1.11166E+01 | -5.77255E+00 | 1.27102E+00 |
| 4 | 2.25444 | 3.79693E-02 | -7.20920E-02 | 5.27674E-01 | -2.20532E+00 | 5.79462E+00 | -9.34752E+00 | 7.83634E+00 | -1.82578E+00 | -8.77729E-01 |
| 5 | 0.00000 | 3.42921E-02 | -1.92490E-02 | 2.31881E-01 | 2.07139E+00 | 8.88021E+00 | -2.25156E+01 | 3.36770E+01 | -2.74328E+02 | 9.38111E+01 |
| 6 | 0.00000 | -1.58318E-01 | 9.66662E-01 | 3.75954E+00 | 1.11671E+01 | 2.38992E+01 | 2.96873E+01 | 1.72725E+01 | 1.68213E+00 | 1.57212E+00 |
| 7 | 0.00000 | -2.19074E-01 | 7.80658E-01 | 2.24245E+00 | 6.29933E+00 | 1.15208E+01 | 1.06727E+01 | 1.84315E+00 | 3.50661E+00 | 1.76705E+00 |
| 8 | 0.00000 | -5.26859E-04 | 2.61978E-01 | -8.05841E-01 | 3.11705E+00 | -7.26341E+00 | 1.08400E+01 | -1.04973E+01 | 6.23979E+00 | -1.75765E+00 |
| 9 | 0.00000 | 3.72108E-02 | -2.51606E-01 | 2.44166E-01 | 1.17719E-01 | -4.98318E-01 | 5.07951E-01 | -2.63485E-01 | 7.13554E-02 | -7.98104E-03 |
| 10 | 0.00000 | 1.58125E-02 | 1.80959E-01 | 2.62093E-01 | -2.76724E-01 | 2.11185E-01 | -1.10230E-01 | 3.66546E-02 | -6.96047E-03 | 5.71659E-04 |
| 11 | 80.60842 | -1.40343E-01 | 2.16973E-01 | -2.75053E-01 | 2.09884E-01 | -1.02966E-01 | 3.42435E-02 | -7.60018E-03 | 1.00945E-03 | -5.96832E-05 |
| 12 | 0.00000 | -1.59067E-01 | 1.77513E-01 | -1.75410E-01 | 1.24350E-01 | -6.12865E-02 | 2.00079E-02 | -4.02630E-03 | 4.46310E-04 | -2.07049E-05 |

FIG. 4

| SECOND EXAMPLE | | | | | |
|---|---|---|---|---|---|
| HFOV = 23.80 | f = 6.067 | | TTL = 6.003 | | |
| SURFACE NUMBER | | RADIUS OF CURVATURE | THICKNESS/ DISTANCE | REFRACTIVE INDEX | ABBE NUMBER | FOCAL LENGTH |

| SURFACE NUMBER | | RADIUS OF CURVATURE | THICKNESS/ DISTANCE | REFRACTIVE INDEX | ABBE NUMBER | FOCAL LENGTH |
|---|---|---|---|---|---|---|
| S0 | OBJECT | infinity | infinity | | | |
| S1 | FIRST LENS | 1.5100 | 0.9080 | 1.544 | 56.090 | 2.770 |
| S2 | | 1752.1300 | 0.1260 | | | |
| S3 | SECOND LENS | 6.7500 | 0.2400 | 1.661 | 20.340 | -7.104 |
| S4 | | 2.7300 | 0.1740 | | | |
| S5 | DIAPHRAM | Infinity | 0.1580 | | | |
| S6 | THIRD LENS | -5.5500 | 0.2400 | 1.650 | 21.460 | -5.140 |
| S7 | | 8.7900 | 0.0880 | | | |
| S8 | FOURTH LENS | 6.6100 | 0.2450 | 1.650 | 21.460 | 10.040 |
| S9 | | -20240.1500 | 1.2090 | | | |
| S10 | FIFTH LENS | -3.0000 | 0.9000 | 1.544 | 56.090 | -4.230 |
| S11 | | 10.4100 | 0.1240 | | | |
| S12 | SIXTH LENS | 17.4800 | 0.7070 | 1.650 | 21.460 | 11.760 |
| S13 | | -13.6300 | 0.0200 | | | |
| S14 | FILTER | Infinity | 0.1100 | 1.523 | 39.070 | |
| S15 | | Infinity | 0.7540 | | | |
| S16 | IMAGING PLANE | Infinity | | | | |

FIG. 7

| | K | A | B | C | D | E | F | G | H | J |
|---|---|---|---|---|---|---|---|---|---|---|
| 1 | -0.39938 | 1.01550E-02 | 8.46695E-04 | 5.69758E-03 | 5.08328E-03 | -3.09802E-03 | 3.86966E-02 | -2.16168E-02 | 4.28565E-03 | |
| 2 | 0.00000 | 5.36502E-02 | 5.41955E-02 | 5.15426E-01 | 1.18753E+00 | -1.53169E+00 | 1.16373E+00 | -4.84253E-01 | 8.51439E-02 | -1.54417E-02 |
| 3 | 0.00000 | 6.15923E-02 | 2.29155E-01 | -2.02006E+00 | 7.05142E+00 | -1.49273E+01 | 2.01509E+01 | -1.67268E+01 | 7.77158E+00 | -1.54417E+00 |
| 4 | 2.30687 | 2.03799E-02 | 4.44517E-01 | -3.89925E+00 | 1.86455E+01 | -5.61648E+01 | 1.07783E+02 | -1.27395E+02 | 8.48316E+01 | -2.45023E+01 |
| 5 | 0.00000 | 4.16122E-02 | -4.72479E-03 | 2.41676E+00 | -2.42104E+01 | 1.07305E+02 | -2.77195E+02 | 4.03025E+02 | -3.25474E+02 | 1.10678E+02 |
| 6 | 0.00000 | 1.48198E-01 | 9.91109E-01 | -3.35781E+00 | 4.46045E+00 | 5.82353E+00 | -3.37489E+01 | 5.52069E+01 | -4.13576E+01 | 1.19191E+01 |
| 7 | 0.00000 | -2.16219E-01 | 7.46551E-01 | 1.00303E+00 | 3.35778E+00 | 2.29263E+00 | -5.60434E+01 | 7.03708E+01 | -4.48194E+01 | 1.14505E+01 |
| 8 | 0.00000 | -5.15759E-03 | 2.73686E-01 | -8.77641E-01 | 4.84070E+00 | -1.89836E+01 | 4.87305E+01 | -7.50829E+01 | 6.24683E+01 | -2.15337E+01 |
| 9 | 0.00000 | 2.80807E-02 | -2.19520E-01 | 2.11391E-01 | 9.52990E-01 | -4.08252E-01 | 4.12344E-01 | -2.12730E-01 | 5.75918E-02 | -6.46320E-03 |
| 10 | 0.00000 | -1.92977E-05 | 1.33371E-01 | 1.81973E-01 | 1.91421E-01 | 1.51583E-01 | 8.27611E-02 | 2.96200E-02 | 5.61511E-03 | 4.74100E-04 |
| 11 | 80.60842 | -1.41249E-01 | 2.16875E-01 | -2.74606E-01 | 2.09244E-01 | -1.02532E-01 | 3.40604E-02 | -7.55044E-03 | 1.00221E-03 | -5.92583E-05 |
| 12 | 0.00000 | -1.55149E-01 | 1.72797E-01 | -1.70780E-01 | 1.20547E-01 | -5.90396E-02 | 1.91325E-02 | -3.81782E-03 | 4.19107E-04 | -1.92180E-05 |

FIG. 8

| THIRD EXAMPLE ||||||
|---|---|---|---|---|---|
| HFOV = 21.45 | | f = 6.704 | TTL = 5.795 | | |
| SURFACE NUMBER | | RADIUS OF CURVATURE | THICKNESS/ DISTANCE | REFRACTIVE INDEX | ABBE NUMBER | FOCAL LENGTH |
| S0 | OBJECT | infinity | infinity | | | |
| S1 | FIRST LENS | 1.5200 | 0.8490 | 1.544 | 56.090 | 2.790 |
| S2 | | 2685.3600 | 0.0720 | | | |
| S3 | SECOND LENS | 8.1500 | 0.1700 | 1.661 | 20.340 | -6.940 |
| S4 | | 2.9000 | 0.0900 | | | |
| S5 | DIAPHRAM | 2.3600 | 0.2000 | 1.650 | 21.460 | -13.690 |
| S6 | THIRD LENS | 1.8100 | 0.1470 | | | |
| S7 | | infinity | 0.3080 | | | |
| S8 | FOURTH LENS | 38.9200 | 0.2380 | 1.650 | 21.460 | -19.270 |
| S9 | | 9.5300 | 1.5230 | | | |
| S10 | FIFTH LENS | -3.1700 | 0.3900 | 1.544 | 56.090 | -4.400 |
| S11 | | 10.4000 | 0.1440 | | | |
| S12 | SIXTH LENS | -27.3300 | 0.7800 | 1.650 | 21.460 | 7.680 |
| S13 | | -4.1000 | 0.0300 | | | |
| S14 | FILTER | Infinity | 0.2100 | 1.523 | 39.070 | |
| S15 | | Infinity | 0.6440 | | | |
| S16 | IMAGING PLANE | Infinity | | | | |

FIG. 11

|   | K | A | B | C | D | E | F | G | H | J |
|---|---|---|---|---|---|---|---|---|---|---|
| 1 | -0.21973 | 4.53607E-03 | 6.90020E-03 | -2.25007E-02 | 9.22334E-02 | -1.95245E-01 | 2.42269E-01 | -1.75424E-01 | 6.90675E-02 | -1.14360E-02 |
| 2 | 0.00000 | 9.42352E-02 | -1.45770E-02 | -3.22902E-01 | 7.78131E-01 | -9.68733E-01 | 7.51660E-01 | -3.68722E-01 | 1.04579E-01 | -1.31084E-02 |
| 3 | 44.35788 | 1.49655E-01 | -1.04336E-01 | -3.33583E-01 | 2.89858E-01 | 6.70980E-01 | -1.45594E+00 | 1.17808E+00 | -4.52157E-01 | 6.81102E-02 |
| 4 | -5.51491 | 7.30812E-02 | 1.83261E-02 | -8.46481E-01 | 2.76647E-01 | 1.74754E+00 | -2.93283E+00 | 2.10398E+00 | -7.60833E-01 | 1.10664E-01 |
| 5 | 0.89534 | -1.95308E-01 | 6.31877E-01 | -1.32948E-01 | 2.59630E+00 | -4.79267E+00 | 5.65283E+00 | -3.32772E+00 | 5.28034E-01 | 1.69909E-01 |
| 6 | 0.00000 | -1.56954E-01 | 6.73102E-01 | 1.71229E+00 | 6.20854E+00 | -1.07831E+01 | -2.15023E+00 | 3.87974E+01 | -5.63620E+01 | 2.67372E+01 |
| 8 | 0.00000 | 6.19005E-02 | 3.20301E-02 | 1.49846E+00 | -9.14513E+00 | 3.41806E+01 | -7.84874E+01 | 1.05972E+02 | -7.88338E+01 | 2.39250E+01 |
| 9 | 0.00000 | 9.36674E-02 | 4.77154E-02 | -4.51362E-01 | 3.42881E-01 | -1.60060E+01 | 4.66631E+01 | 8.26500E+01 | 8.13079E+02 | -3.40245E+02 |
| 10 | 0.00000 | -5.48233E-02 | 5.26674E-02 | -3.33905E-01 | 7.25655E-01 | -7.97055E-01 | 5.12223E-01 | -1.95650E-01 | 4.13535E-02 | -3.73443E-03 |
| 11 | 0.00000 | 6.91918E-02 | -2.68624E-02 | 3.09412E-01 | -1.98979E-01 | 7.30175E-01 | -1.42702E-01 | 9.45759E-04 | 1.14789E-04 | -1.69057E-05 |
| 12 | 59.50848 | 8.83233E-02 | -2.65446E-02 | 3.38460E-01 | -2.38920E-01 | 1.01245E-01 | -2.66202E-02 | 4.27955E-03 | -3.86452E-04 | 1.50295E-05 |
| 13 | 0.00000 | -1.41562E-02 | -7.11406E-02 | 7.58295E-02 | -3.25234E-02 | 6.33402E-03 | -2.07259E-04 | -9.49266E-05 | 1.31820E-05 | -5.16402E-07 |

FIG. 12

OPTICAL IMAGING SYSTEM

CROSS-REFERENCE TO RELATED APPLICATION(S)

This application is a Continuation Application of U.S. application Ser. No. 16/244,287, filed on Jan. 10, 2019, which is a Continuation Application based on U.S. application Ser. No. 15/467,433, filed on Mar. 23, 2017, which claims the benefit under 35 U.S.C. § 119(a) of Korean Patent Application No. 10-2016-0117293 filed on Sep. 12, 2016, in the Korean Intellectual Property Office, the entire disclosure of which is incorporated herein by reference for all purposes.

BACKGROUND

1. Field

The following description relates to a telescopic optical imaging system configured to include six lenses.

2. Description of Related Art

Telescopic optical imaging systems capable of performing long-distance imaging are commonly considerably large. For example, in the case of telescopic optical imaging systems, a ratio (TL/f) of a total length (TL) of an optical system to an overall focal length (f) of lenses is 1 or more. Thus, it may be difficult to mount a telescopic optical imaging system in a small, electronic product such as a portable terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a positive refractive power, a second lens having a negative refractive power, a third lens having a negative refractive power, a fourth lens, a fifth lens, and a sixth lens having a positive refractive power and a convex image-side surface along an optical axis of the optical imaging system.

The second lens may have a concave image-side surface along the optical axis. The third lens may include a concave image-side surface along the optical axis. The fourth lens can have a convex object-side surface along the optical axis.

The fifth lens may have a concave image-side surface along the optical axis. The fifth lens also may have a negative refractive power. The optical imaging system may be configured such that the first to sixth lenses are disposed with an interval between each respective lens.

The optical imaging system may satisfy the conditional expression $0.7<TL/f<1.0$, where TL represents a distance from an object-side surface of the first lens to an imaging plane, and f represents a total focal length of the optical imaging system. The optical imaging system can also satisfy the conditional expression $0.15<R1/f<0.32$, where R1 represents a radius of curvature of an object-side surface of the first lens, and f represents a total focal length of the optical imaging system.

The optical imaging system may satisfy the conditional expression $-3.5<f/f2<-0.5$, where f represents a total focal length of the optical imaging system, and f2 represents a focal length of the second lens. The optical imaging system can satisfy the conditional expression $0.1<D45/TL<0.7$, where TL represents a distance from an object-side surface of the first lens to an imaging plane, and D45 represents a distance from an image-side surface of the fourth lens to an object-side surface of the fifth lens.

The optical imaging system can satisfy the conditional expression $1.60<Nd6<1.75$, where Nd6 represents a refractive index of the sixth lens. The optical imaging system may satisfy the conditional expression $0.3<\tan\theta<0.5$, where $\theta$ represents a half angle of view of the optical imaging system. The optical imaging system may also satisfy the conditional expression $2.0<f/EPD<2.7$, where f represents a total focal length of the optical imaging system, and EPD represents a diameter of an entrance aperture.

In another general aspect, an optical imaging system includes a first lens having a positive refractive power, a second lens having a negative refractive power, a third lens having a negative refractive power, a fourth lens, a fifth lens, and a sixth lens having a positive refractive power and a convex image-side surface along an optical axis of the optical imaging system.

In yet another general aspect, an optical imaging system includes a first lens having a convex object-side surface along an optical axis of the system, a second lens having a concave image-side surface along the optical axis, a third lens having a concave image-side surface along the optical axis, a fourth lens having a convex object-side surface along the optical axis, a fifth lens having a negative refractive power, and a sixth lens.

The second lens may have a convex object-side surface along the optical axis. The fifth lens may have a concave object-side surface along the optical axis.

Other features and aspects will be apparent from the following detailed description, the drawings, and the claims.

BRIEF DESCRIPTION OF DRAWINGS

FIG. 3 is a table of lens characteristics of the optical imaging system illustrated in FIG. 1.

FIG. 4 is a table of aspheric characteristics of the optical imaging system illustrated in FIG. 1.

FIG. 7 is a table of lens characteristics of the optical imaging system illustrated in FIG. 5.

FIG. 8 is a table of aspheric characteristics of the optical imaging system illustrated in FIG. 5.

FIG. 11 is a table of lens characteristics of the optical imaging system illustrated in FIG. 9.

FIG. 12 is a table of aspheric characteristics of the optical imaging system illustrated in FIG. 9.

Figure 1:
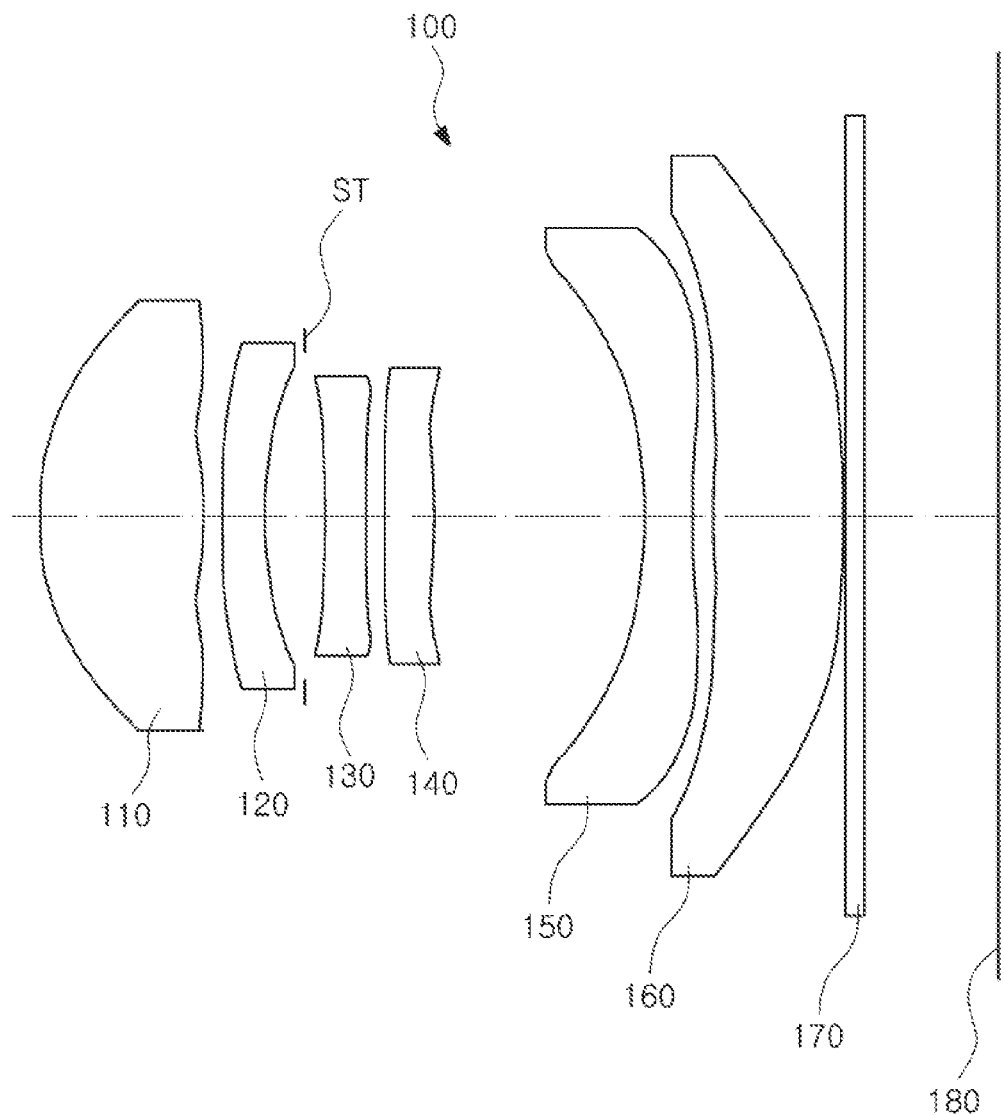
FIG. 1 is a lens configuration view illustrating an optical imaging system according to a first example.

Throughout the drawings and the detailed description, the same reference numerals refer to the same elements, where applicable. The drawings may not be to scale, and the relative size, proportions, and depiction of elements in the drawings may be exaggerated for the purposes of clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples provide an optical imaging system capable of performing long-distance imaging, which can also be mounted in a small-sized terminal. Subsequently, examples are described in further detail with reference to the accompanying drawings.

Further, in the present specification, a first lens refers to a lens closest to an object (or a subject) from which an image is captured. A sixth lens refers to a lens closest to an imaging plane (or an image sensor). In an embodiment, all radii of curvature, thicknesses, TLs, image heights (IMG HT, a half ($\frac{1}{2}$) of a diagonal length of an imaging plane), and focal lengths of lenses are provided in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

In addition, in a description of shapes of the lenses, the meaning that one surface of a lens is convex is that an optical axis portion of the surface is convex, and the meaning that one surface of a lens is concave is that an optical axis portion of the surface is concave. Thus, although it is described that one surface of a lens is convex, an edge portion of the lens may be concave. Similarly, although it is described that one surface of a lens is concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include six lenses with a refractive power. However, the number of lenses in the optical system may vary, for example, between two to six lenses, while achieving the various results and benefits described below. Also, although each lens is described with a particular refractive power, a different refractive power for at least one of the lenses may be used to achieve the intended result.

An optical imaging system includes six lenses. For example, the optical imaging system may include a first lens, a second lens, a third lens, a fourth lens, a fifth lens, and a sixth lens sequentially arranged from an object side.

The first lens has a refractive power. In an example, the first lens has a positive refractive power. The first lens may have a shape in which at least one surface is convex. For example, the first lens has a convex object-side surface.

The first lens includes an aspherical surface. In an embodiment, two surfaces of the first lens are aspherical surfaces. The first lens is formed of a material having a relatively high degree of light transmissivity and excellent processability. For example, the first lens is formed of a plastic material, but is not limited thereto. In another example, the first lens may be formed of glass. The first lens has a relatively low refractive index. For example, the refractive index of the first lens is lower than 1.6.

The second lens has a refractive power. In an example, the second lens has a negative refractive power. The second lens has a shape in which at least one surface is concave. For example, the second lens has a concave image-side surface.

The second lens includes an aspherical surface. In an embodiment, an object-side surface of the second lens is an aspherical surface. The second lens is formed of a material having a relatively high degree of light transmissivity and excellent processability. For example, the second lens is formed of a plastic material, but is not limited thereto. In another example, the second lens may also be formed of glass. The second lens has a higher refractive index than the refractive index of the first lens. In an embodiment, the refractive index of the second lens is 1.6 or more.

The third lens has a refractive power. In an embodiment, the third lens has a negative refractive power. The third lens has a shape in which at least one surface is concave. For example, the third lens has a concave image-side surface.

The third lens includes an aspherical surface. In an embodiment, an image-side surface of the third lens is an aspherical surface. The third lens is formed of a material having a relatively high degree of light transmissivity and excellent processability. For example, the third lens is formed of a plastic material, but is not limited thereto. In another example, the third lens may be formed of glass. The third lens has a higher refractive index than the refractive index of the first lens. For example, the refractive index of the third lens is 1.6 or more.

The fourth lens has a refractive power. In an embodiment, the fourth lens may have a positive or a negative refractive power. The fourth lens has a shape in which at least one surface is convex. For example, the fourth lens has a convex object-side surface.

The fourth lens includes an aspherical surface. In an embodiment, two surfaces of the fourth lens may be aspherical surfaces. The fourth lens is formed of a material having a relatively high degree of light transmissivity and excellent processability. For example, the fourth lens is formed of a plastic material, but is not limited thereto. In another example, the fourth lens may be formed of glass. The fourth lens has a higher refractive index than the refractive index of the first lens. For example, the refractive index of the fourth lens is 1.6 or more.

The fifth lens has a refractive power. In one embodiment, the refractive power of the fifth lens is positive. In another embodiment, the fifth lens has a negative refractive power.

In an example, the fifth lens includes an aspherical surface. For example, two surfaces of the fifth lens may be aspherical surfaces. The fifth lens is formed of a material having a relatively high degree of light transmissivity and excellent processability. For example, the fifth lens is formed of a plastic material, but is not limited thereto. In another example, the fifth lens may be formed of glass. The fifth lens has a refractive index substantially identical to the refractive index of the first lens. For example, the refractive index of the fifth lens is lower than 1.6.

In an example, the sixth lens has a positive refractive power. The sixth lens may have a shape in which at least one surface is convex. For example, the sixth lens has a convex image-side surface. The sixth lens may have an inflection point. For example, one or more inflection points are formed on two surfaces of the sixth lens.

The sixth lens includes an aspherical surface. In an embodiment, two surfaces of the sixth lens are aspherical surfaces. The sixth lens is formed of a material having a relatively high degree of light transmissivity and excellent processability. For example, the sixth lens is formed of a plastic material, but is not limited thereto. In another example, the sixth lens may be formed of glass. The sixth lens has a higher refractive index than the refractive index of the first lens. For example, the refractive index of the sixth lens is 1.6 or more.

The aspherical surfaces of the first to sixth lenses may be represented by Equation 1.

$$Z = cr^2 / 1 + \sqrt{1-(1+k)c^2r^2} + Ar^4 + Br^6 + Cr^8 + Dr^{10} + Er^{12} + Fr^{14} + Gr^{16} + Hr^{18} + Jr^{20} \quad \text{[Equation 1]}$$

In Equation 1, c represents an inverse number of a radius of curvature of a corresponding lens, k represents a conic constant, and r represents a distance from a certain point on an aspherical surface to an optical axis. In addition, A to J represent aspherical surface constants, and Z (or SAG) represents a distance between a certain point on an aspherical surface and an apex of the aspherical surface in an optical axis direction.

The optical imaging system further includes a filter, an image sensor, and a diaphragm.

The filter is disposed between the sixth lens and the image sensor. The filter may block a portion of wavelengths of light to enhance the capture of a clear image. In one embodiment, the filter blocks light of an infrared wavelength.

The image sensor forms an imaging plane. For example, a surface of the image sensor may form the imaging plane.

The diaphragm is arranged to adjust an amount of light incident through a lens. For example, the diaphragm is disposed between the second lens and the third lens. Alternatively, the diaphragm can be disposed between the third lens and the fourth lens.

The optical imaging system may satisfy one or any combination of the following conditional expressions.

| | |
|---|---|
| $0.7 < TL/f < 1.0$ | [Conditional Expression 1] |
| $0.15 < R1/f < 0.32$ | [Conditional Expression 2] |
| $-3.5 < f/f2 < -0.5$ | [Conditional Expression 3] |
| $0.1 < D45/TL < 0.7$ | [Conditional Expression 4] |
| $1.6 < Nd6 < 1.75$ | [Conditional Expression 5] |
| $0.3 < \tan \theta < 0.5$ | [Conditional Expression 6] |
| $2.0 < f/EPD < 2.7$ | [Conditional Expression 7] |

In the above conditional expressions, TL represents a distance from an object-side surface of the first lens to an imaging plane. In Conditional Expressions 2 and 3, f represents a total focal length of the optical imaging system, and f2 represents a focal length of the second lens, and R1 represents a radius of curvature of the object-side surface of the first lens. In Conditional Expression 4 and 5, D45 represents a distance from an image-side surface of the fourth lens to an object-side surface of the fifth lens, and Nd6 represents a refractive index of the sixth lens. In Conditional Expression 6, θ represents a half angle of view of the optical imaging system. In Conditional Expression 7, EPD represents a diameter of an entrance aperture and f again represents the total focal length of the optical imaging system.

Conditional Expression 1 is a condition for enhancing the miniaturization of the optical imaging system. For example, if an optical imaging system is outside of an upper limit value of Conditional Expression 1, it may be difficult to miniaturize the optical imaging system, and thus, it may be difficult to mount the optical imaging system in a portable terminal. Further, if an optical imaging system is outside of a lower limit value of Conditional Expression 1, it may be difficult to manufacture the optical imaging system.

Conditional Expression 2 is a condition for manufacturing the first lens to configure a telescopic optical imaging system. For example, if a first lens is outside of an upper limit value of Conditional Expression 2, a longitudinal spherical aberration may be increased and a focal length of the optical imaging system may be reduced. Further, if a first lens is outside of a lower limit value of Conditional Expression 2, a focal length of the optical imaging system may be increased, but the manufacturing thereof may be difficult.

Conditional Expression 3 is a parameter of the second lens to implement a high-resolution optical imaging system. For example, if a second lens is outside of a numerical range of Conditional Expression 3, deterioration in an image may occur by increasing astigmatism of the optical imaging system.

Conditional Expression 4 is a ratio of parameters to configure a telescopic optical imaging system. For example, if an optical imaging system is outside of a lower limit value of Conditional Expression 4, it may be difficult to use the optical imaging system as a telescopic optical imaging system due to a reduction in focal length. Further, if an optical imaging system is outside of an upper limit value of Conditional Expression 4, it may be difficult to miniaturize the optical imaging system due to an increase in a total length TL of an optical system.

Conditional Expression 5 is a parameter of the fifth lens to implement a high-resolution optical imaging system. For example, the fifth lens, satisfying a numerical range of Conditional Expression 5, may have a low Abbe number of 26 or less, which thus corrects astigmatism, longitudinal chromatic aberrations, and magnification aberrations.

Conditional Expression 6 is a range of angle of view to configure a telescopic optical imaging system, and Conditional Expression 7 is a numerical range of F numbers for a high-resolution optical imaging system.

Hereinafter, an optical imaging system according to various examples will be described. First, an optical imaging system according to a first example will be described with reference to FIG. 1. An optical imaging system 100 includes a first lens 110, a second lens 120, a third lens 130, a fourth lens 140, a fifth lens 150, and a sixth lens 160.

The first lens 110 has a positive refractive power, and two surfaces of the first lens 110 have a convex shape. The second lens 120 has a negative refractive power, and has a convex object-side surface and a concave image-side surface. The third lens 130 has a negative refractive power, and two surfaces thereof have a concave shape.

The fourth lens 140 has a positive refractive power and has two convex surfaces. The fifth lens 150 has a negative refractive power and has a shape in which two surfaces are concave. In addition, the fifth lens 150 has inflection points on two surfaces thereof. The sixth lens 160 has a positive refractive power, and has two convex surfaces. In addition, the sixth lens 160 has an inflection point on an object-side surface or an image-side surface.

The optical imaging system 100 further includes a filter 170, an image sensor 180, and a diaphragm ST. The filter 170 is disposed between the sixth lens 160 and the image sensor 180, while the diaphragm ST is disposed between the second lens 120 and the third lens 130.

Figure 2:
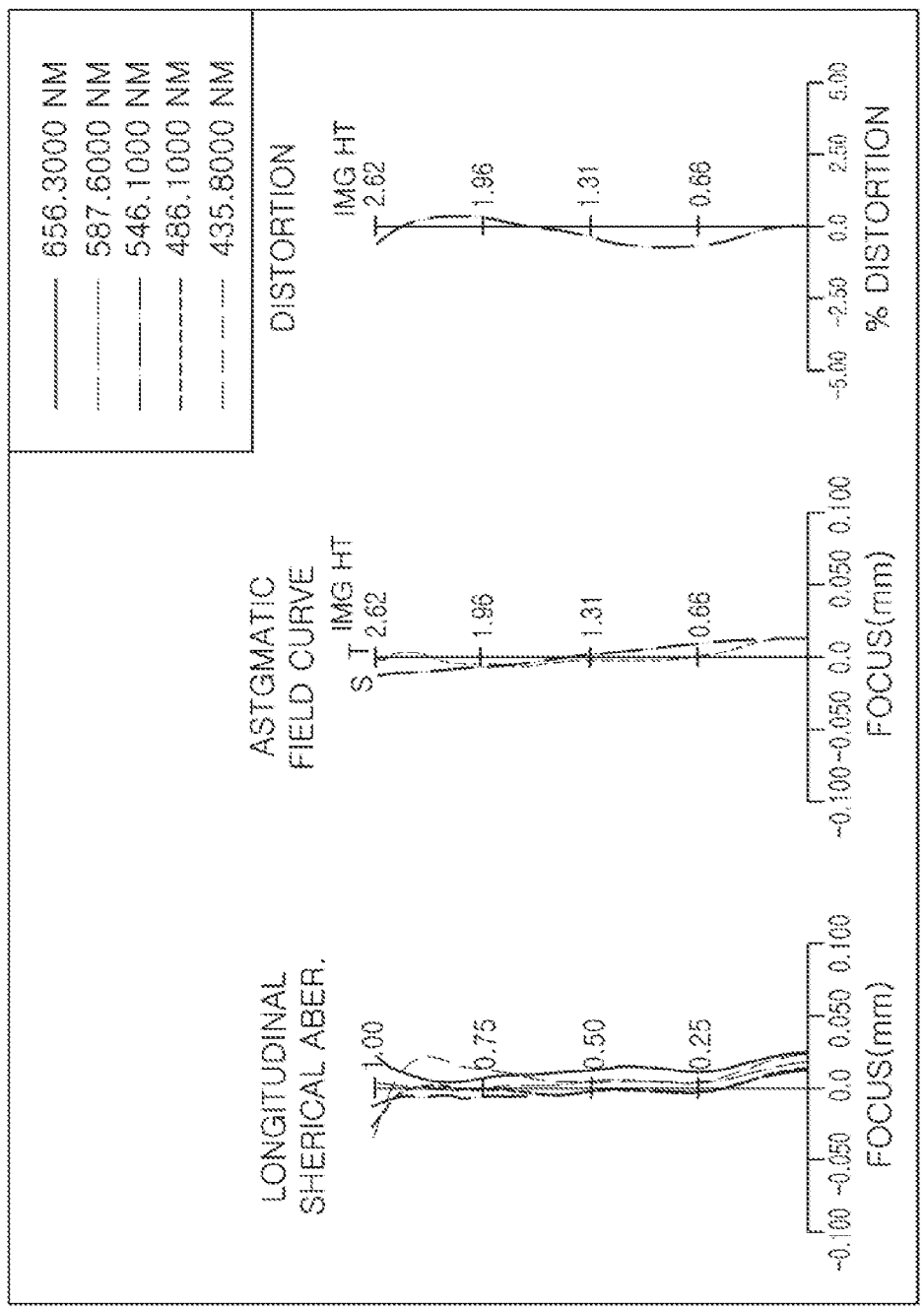
FIG. 2 is a graph illustrating aberration curves of the optical imaging system illustrated in FIG. 1.

The optical imaging system configured as described in the example above provides aberration characteristics as represented in the graphs of FIG. 2. FIGS. 3 and 4 are tables of certain lens characteristics and aspherical characteristics of the optical imaging system according to the first example.

Figure 5:
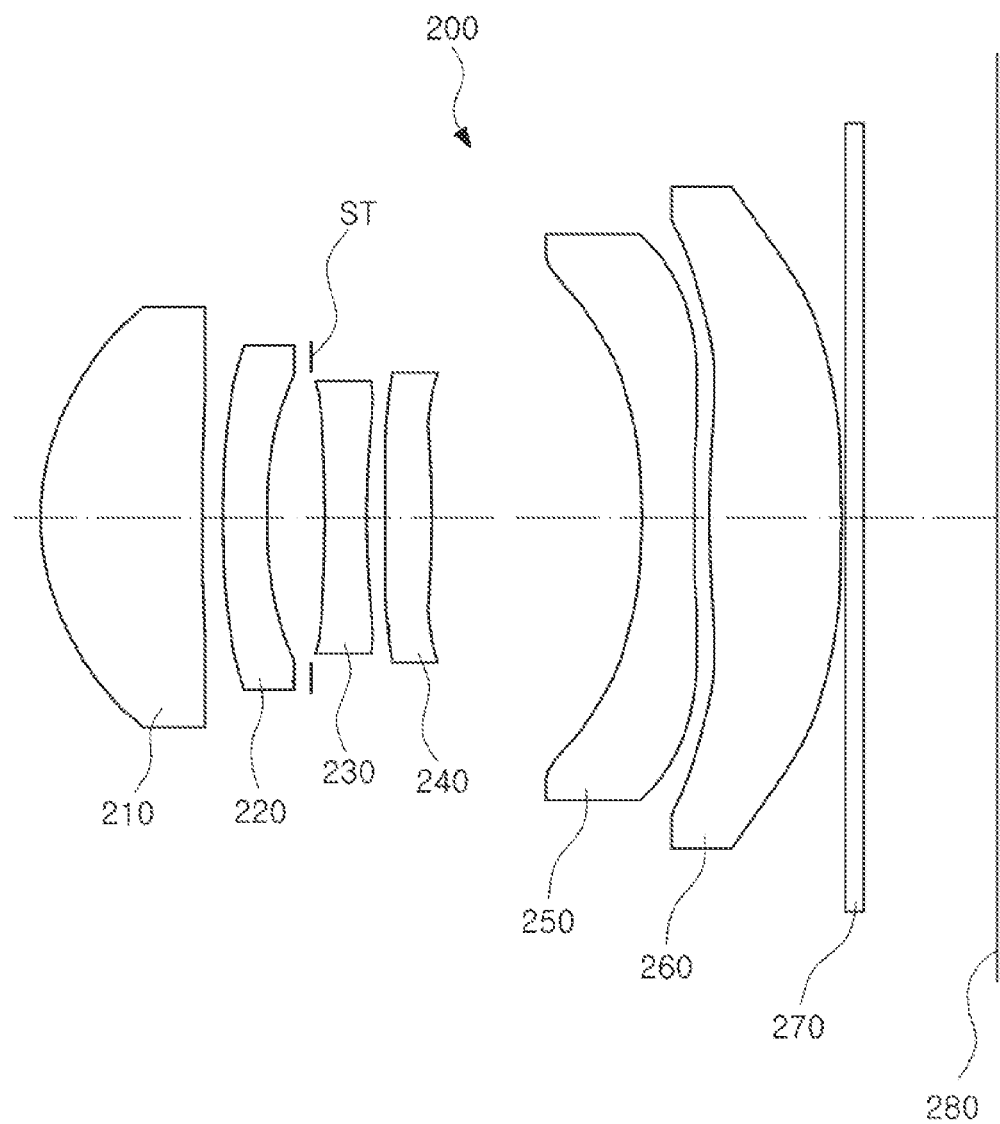
FIG. 5 is a lens configuration view illustrating an optical imaging system according to a second example.

An optical imaging system according to a second example will be described with reference to FIG. 5. An optical imaging system 200 includes a first lens 210, a second lens 220, a third lens 230, a fourth lens 240, a fifth lens 250, and a sixth lens 260.

The first lens 210 has a positive refractive power, and has a convex object-side surface and a concave image-side surface. The second lens 220 has a negative refractive power, and has a convex object-side surface and a concave image-side surface. The third lens 230 has a negative refractive power, and has two concave surfaces. The fourth lens 240 has a positive refractive power and has two convex surfaces. The fifth lens 250 has a negative refractive power and has two concave surfaces. The fifth lens 250 has inflection points on two surfaces thereof. The sixth lens 260 has a positive refractive power, and has two convex surfaces. In addition, the sixth lens 260 has an inflection point on at least one surface thereof.

The optical imaging system 200 further includes a filter 270, an image sensor 280, and a diaphragm ST. The filter 270 is disposed between the sixth lens 260 and the image sensor 280, and the diaphragm ST is disposed between the second lens 220 and the third lens 230.

Figure 6:
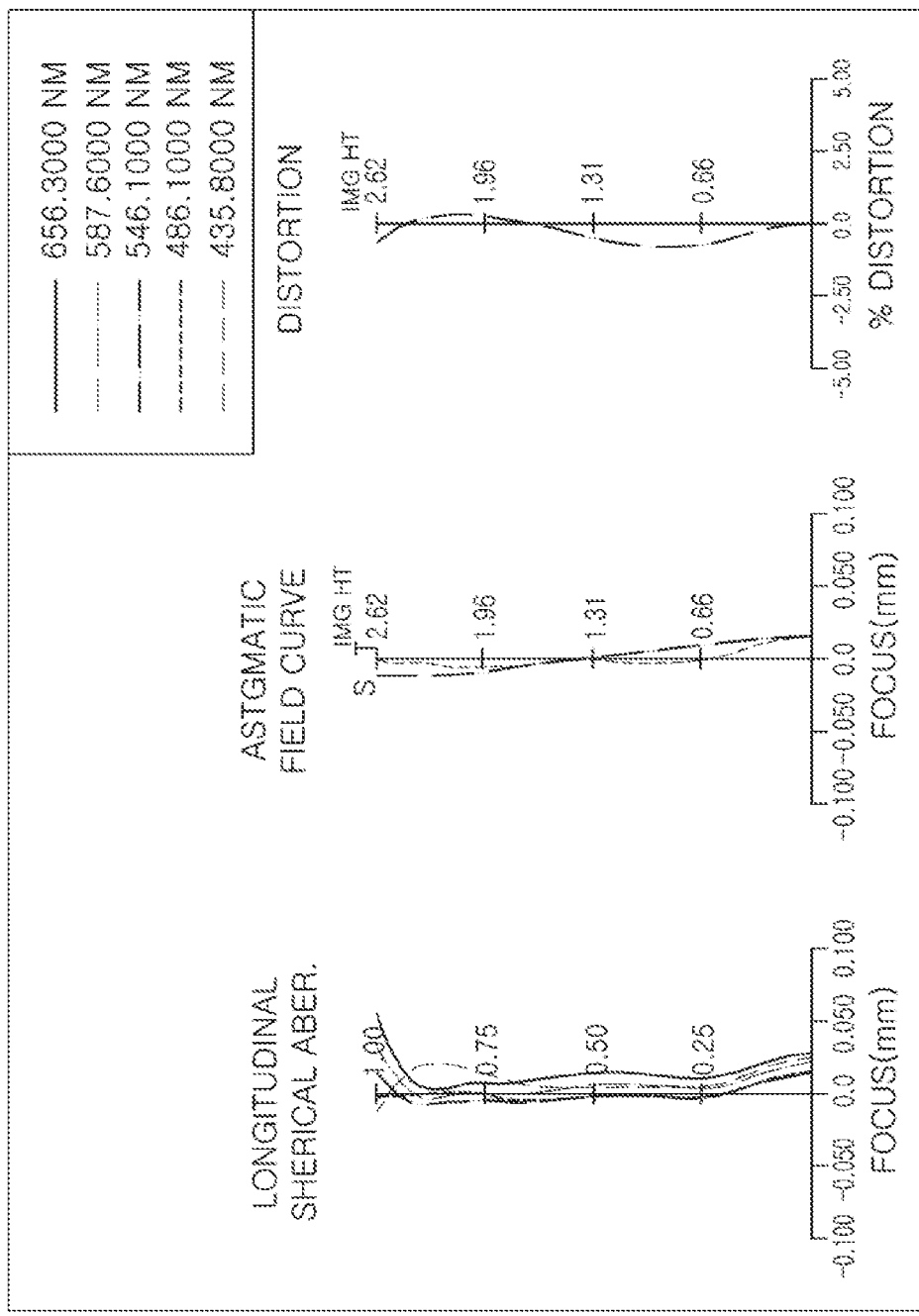
FIG. 6 is a graph illustrating aberration curves of the optical imaging system illustrated in FIG. 5.

The optical imaging system configured as described in the second example above provides aberration characteristics as represented in the graphs of FIG. 6. FIGS. 7 and 8 are tables of certain lens characteristics and aspherical characteristics of the optical imaging system according to the second example.

Figure 9:
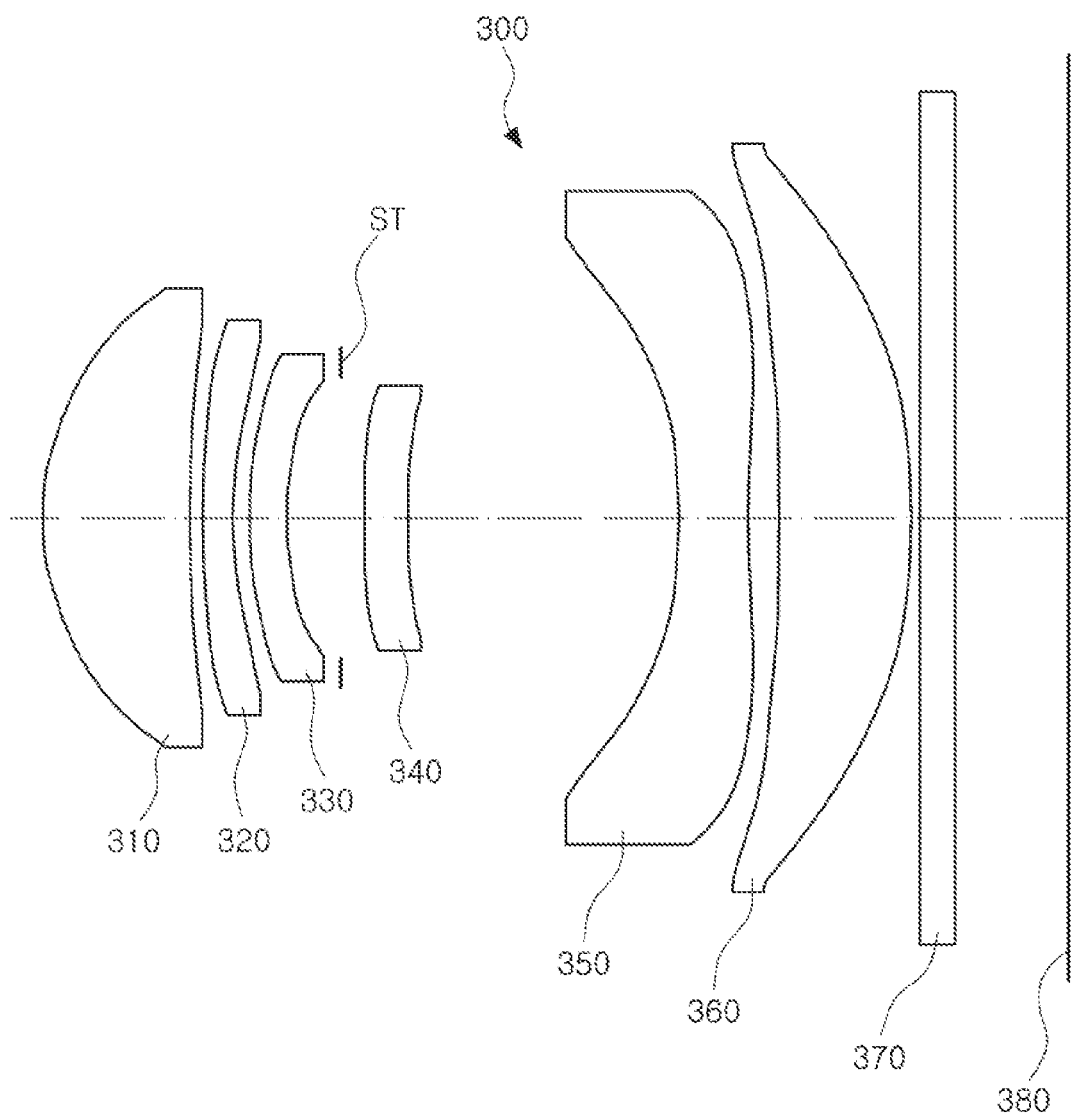
FIG. 9 is a lens configuration view illustrating an optical imaging system according to a third example.

An optical imaging system according to a third example will be described with reference to FIG. 9. An optical imaging system 300 includes a first lens 310, a second lens 320, a third lens 330, a fourth lens 340, a fifth lens 350, and a sixth lens 360.

In the third example, the first lens 310 has a positive refractive power, a convex object-side surface and a concave image-side surface. The second lens 320 has a negative refractive power, a convex object-side surface and a concave image-side surface. The third lens 330 has a negative refractive power, a convex object-side surface and a concave image-side surface. The fourth lens 340 has a negative refractive power, a convex object-side surface and a concave image-side surface. The fifth lens 350 has a negative refractive power and two concave surfaces. The fifth lens 350 has inflection points on two surfaces thereof. The sixth lens 360 has a positive refractive power, a concave object-side surface and a convex image-side surface. In addition, the sixth lens 360 has an inflection point on at least one surface thereof.

The optical imaging system 300 further includes a filter 370, an image sensor 380, and a diaphragm ST. The filter 370 is disposed between the sixth lens 360 and the image sensor 380, and the diaphragm ST is disposed between the third lens 330 and the fourth lens 340.

Figure 10:
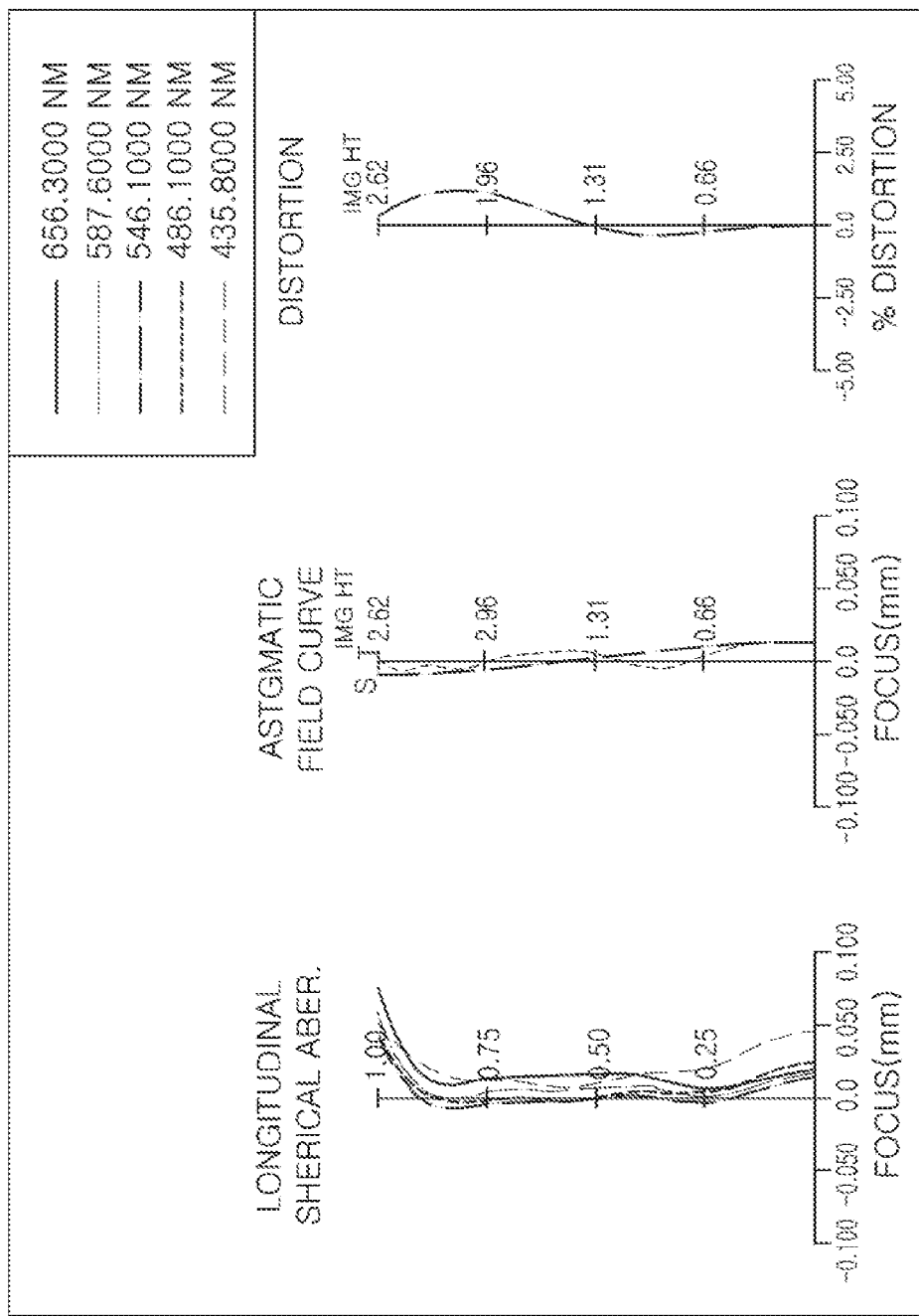
FIG. 10 is a graph illustrating aberration curves of the optical imaging system illustrated in FIG. 9.

The optical imaging system configured as described in the third example above provides aberration characteristics as represented in the graphs of FIG. 10. FIGS. 11 and 12 are tables of certain lens characteristics and aspherical characteristics of the optical imaging system according to the third example.

Table 1 contains values of various conditional expressions of the optical imaging systems according to the first to third examples.

TABLE 1

| Conditional Expression | First Example | Second Example | Third Example |
|---|---|---|---|
| TL/f | 0.8997 | 0.8996 | 0.8644 |
| R1/f | 0.252 | 0.252 | 0.227 |
| f/f2 | −0.862 | −0.854 | −0.966 |
| d45/TL | 0.220 | 0.224 | 0.263 |
| Nd6 | 1.650 | 1.650 | 1.650 |
| tanΘ | 0.441 | 0.441 | 0.393 |
| f/EPD | 2.480 | 2.480 | 2.680 |

Figure 13:
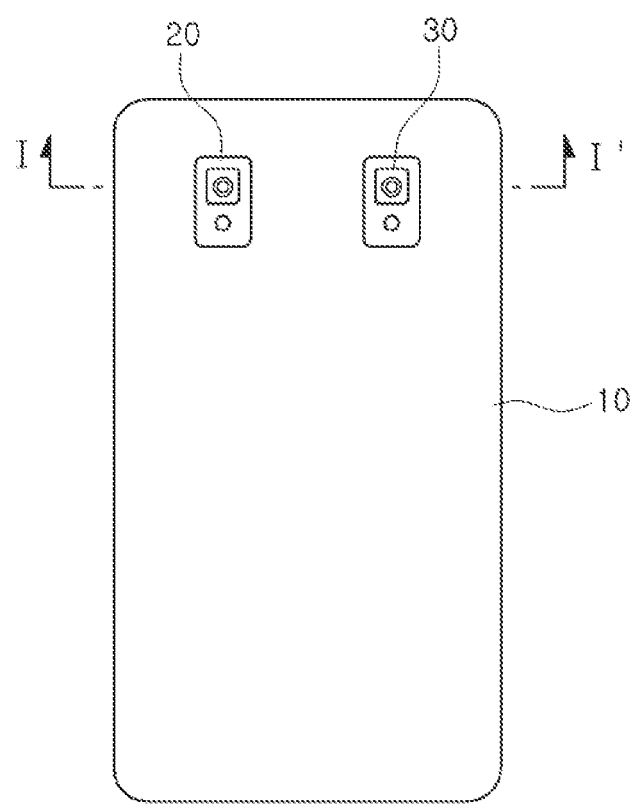
FIG. 13 is a rear view of a portable terminal on which an optical imaging systems are mounted according to an example.
Figure 14:
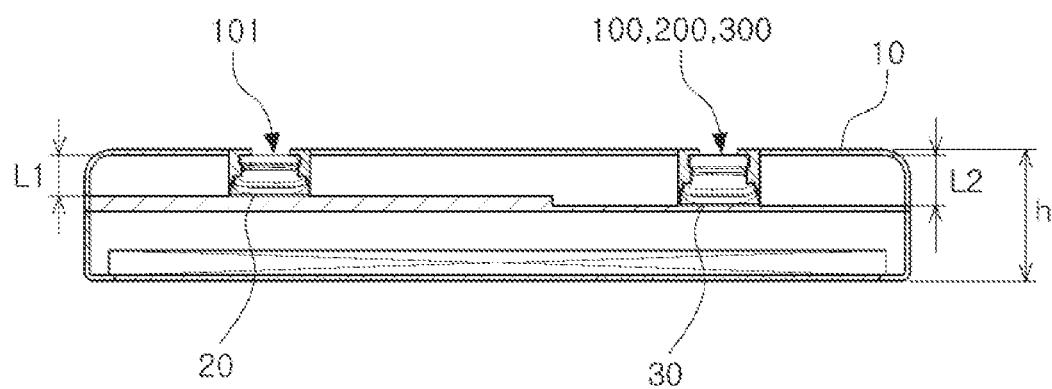
FIG. 14 is a cross-sectional view of the portable terminal illustrated in FIG. 13.

With reference to FIGS. 13 and 14, a portable terminal in which an optical imaging system is mounted will be described below according to an example. A portable terminal 10 includes camera modules 20 and 30. The first camera module 20 includes a first optical imaging system 101 configured to capture an image of a subject at a relatively short distance, and the second camera module 30 includes second optical imaging systems 100, 200 and 300 configured to capture an image of a subject relatively distantly.

The first optical imaging system 101 includes a plurality of lenses. For example, the first optical imaging system 101 includes four or more lenses. The first optical imaging system 101 is configured to integrally capture images of objects located in relative close proximity. For example, the first optical imaging system 101 has a wide angle of view of 50 degrees or more, and a TL/f ratio may be 1.0 or more.

The second optical imaging systems 100, 200 and 300 include a plurality of lenses. For example, the second optical imaging systems 100, 200 and 300 are respectively configured using six lenses. The second optical imaging systems 100, 200 and 300 may respectively be any one of the optical imaging systems according to the first to third examples described above. The second optical imaging systems 100, 200 and 300 are configured to capture images of objects located relatively distantly. For example, the second optical imaging systems 100, 200 300 have an angle of view of 40 degrees or less, and a TL/f ratio is less than 1.0 but greater than 0.7.

The first optical imaging system 101 and the second optical imaging systems 100, 200 and 300 may have substantially the same size. For example, a total length L1 of the first optical imaging system 101 is substantially the same as a total length L2 of each of the second optical imaging systems 100, 200 and 300. Alternatively, a ratio (L1/L2) of the total length L1 of the first optical imaging system 101 to the total length L2 of each of the second optical imaging systems 100, 200 and 300 may be within a range of 0.8 to 1.0. In another alternative example, a ratio (L2/h) of the total length L2 of each of the second optical imaging systems 100, 200 and 300 to a thickness h of the portable terminal 10 is 0.8 or less.

As set forth above, according to various examples, an optical imaging system mounted in a small-sized terminal can be implemented, while being capable of performing long-distance imaging.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens comprising a convex image-side surface, a second lens, a third lens comprising negative refractive power, a fourth lens, a fifth lens, and a sixth lens comprising positive refractive power and a convex object-side surface in a paraxial portion sequentially arranged from an object side to an image side,
wherein $0.7<TL/f<1.0$ and $0.1<D45/TL<0.7$,
where TL represents a distance from an object-side surface of the first lens to an imaging plane, f represents a total focal length of the optical imaging system, and D45 represents a distance from an image-side surface of the fourth lens to an object-side surface of the fifth lens.

2. The optical imaging system of claim 1, wherein the first lens comprises positive refractive power.

3. The optical imaging system of claim 1, wherein the second lens comprises negative refractive power.

4. The optical imaging system of claim 1, wherein the fifth lens comprises negative refractive power.

5. The optical imaging system of claim 1, wherein the second lens comprises a convex object-side surface.

6. The optical imaging system of claim 1, wherein the second lens comprises a concave image-side surface.

7. The optical imaging system of claim 1, wherein the third lens comprises a concave image-side surface.

8. The optical imaging system of claim 1, wherein the fourth lens comprises a convex object-side surface along the optical axis.

9. The optical imaging system of claim 1, wherein the fourth lens comprises a convex image-side surface along the optical axis.

10. The optical imaging system of claim 1, wherein the fifth lens comprises a concave image-side surface along the optical axis.

11. The optical imaging system of claim 1, wherein the sixth lens comprises a convex image-side surface along the optical axis.

12. An optical imaging system, comprising:
a first lens, a second lens, a third lens comprising negative refractive power, a fourth lens comprising a convex object-side surface, a fifth lens, and a sixth lens comprising positive refractive power and a convex object-side surface in a paraxial portion sequentially arranged from an object side to an image side,
wherein $0.7<TL/f<1.0$ and $0.1<D45/TL<0.7$,
where TL represents a distance from an object-side surface of the first lens to an imaging plane, f represents a total focal length of the optical imaging system, and D45 represents a distance from an image-side surface of the fourth lens to an object-side surface of the fifth lens.

13. The optical imaging system of claim 12, wherein:

$$0.15<R1/f<0.32,$$

where R1 represents a radius of curvature of an object-side surface of the first lens.

14. The optical imaging system of claim 12, wherein:

$-3.5 < f/f2 < -0.5$, where f2 represents a focal length of the second lens.

15. The optical imaging system of claim 12, wherein:

$1.60 < Nd6 < 1.75$, where Nd6 represents a refractive index of the sixth lens.

16. The optical imaging system of claim 12, wherein:

$0.3 < \tan \theta < 0.5$ where θ represents a half angle of view of the optical imaging system.

17. The optical imaging system of claim 12, wherein:

$2.0 < f/EPD < 2.7$, where EPD represents a diameter of an entrance aperture.

18. The optical imaging system of claim 12, wherein the sixth lens comprises an inflection point formed on an image-side surface.

* * * * *